(12) United States Patent
Wroblewski

(10) Patent No.: US 7,484,184 B2
(45) Date of Patent: Jan. 27, 2009

(54) GRAPHICAL CURSOR NAVIGATION METHODS

(75) Inventor: Frank J. Wroblewski, Gaithersburg, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 403 days.

(21) Appl. No.: 11/185,220

(22) Filed: Jul. 19, 2005

(65) Prior Publication Data

US 2006/0020905 A1   Jan. 26, 2006

Related U.S. Application Data

(60) Provisional application No. 60/589,466, filed on Jul. 20, 2004.

(51) Int. Cl.
*G06F 3/048* (2006.01)
*G06F 3/033* (2006.01)

(52) U.S. Cl. ............... 715/856; 715/702; 715/779; 715/810; 715/863

(58) Field of Classification Search ............ 715/856
See application file for complete search history.

(56) References Cited

U.S. PATENT DOCUMENTS

| | | | |
|---|---|---|---|
| 5,598,183 A * | 1/1997 | Robertson et al. ........... 715/856 |
| 5,710,574 A * | 1/1998 | Jaaskelainen, Jr. ........... 715/856 |
| 5,786,805 A | 7/1998 | Barry |
| 5,963,191 A | 10/1999 | Jaaskelainen, Jr. |
| 6,295,049 B1 | 9/2001 | Minner |
| 6,628,315 B1 * | 9/2003 | Smith Dawkins et al. ... 715/856 |
| 6,664,989 B1 * | 12/2003 | Snyder et al. ............... 715/856 |
| 6,788,284 B1 * | 9/2004 | Culler .......... 345/156 |
| 6,867,790 B1 | 3/2005 | Brooks |
| 6,995,746 B2 * | 2/2006 | Aymeric ...................... 345/156 |
| 7,194,702 B1 * | 3/2007 | Peasley ...................... 715/856 |
| 2002/0133310 A1 * | 9/2002 | Tamura ...................... 702/139 |
| 2002/0151327 A1 * | 10/2002 | Levitt ......................... 455/556 |
| 2003/0197744 A1 * | 10/2003 | Irvine ......................... 345/856 |
| 2004/0268393 A1 | 12/2004 | Hunleth et al. |

FOREIGN PATENT DOCUMENTS

EP   1 094 383 A2   4/2001

OTHER PUBLICATIONS

Written Opinion for PCT/US2005/025554, mailed Mar. 30, 2006.
International Search Report for PCT/US2005/02554, mailed Mar. 30, 2006.

* cited by examiner

*Primary Examiner*—Dennis-Doon Chow
*Assistant Examiner*—Yongjia Pan
(74) *Attorney, Agent, or Firm*—Potomac Patent Group PLLC

(57) ABSTRACT

A method for actuating a button on a graphical user interface (GUI) is disclosed. The method includes navigating a graphical cursor corresponding to an input device onto the button, activating a fence around a border of the button if the navigation occurs via a pre-defined portion of the border and navigating the graphical cursor away from the button via a pre-defined area of the button.

18 Claims, 8 Drawing Sheets

GRAPHICAL CURSOR NAVIGATION METHODS

RELATED APPLICATIONS

This application claims priority from U.S. Provisional Patent Application No. 60/589,466 filed on Jul. 20, 2004 and entitled "Easy To Use Button-Less Interaction With A Pointing Device". This application is also related to U.S. patent application Ser. No. 10/768,432. The subject matter of each of these applications is incorporated herein in their entirety by reference.

BACKGROUND

The present invention is directed to user interfaces and more Particularly, to a method of navigation and interaction with a user interface. Such interaction and navigation involve operating an input device such as a mouse, a trackball or a three-dimensional (hereinafter "3D") pointing remote device. The operation of the input device includes at least one of scroll, point, click, gesture, etc.

User interfaces, such as graphical user interfaces (GUIs) are well known. Virtually all computers include (or, enable) a graphical user interface in order to make the interaction with the computer more "user friendly". This is accomplished by reducing, if not eliminating, the number of keystrokes a user is required to enter (or depress or input, etc.) in order to perform a function such as launching an application residing on the computer. An increasing number of other electronic devices, from cell phones to user controls on appliances, rely on various graphical user interfaces that facilitate a user interaction with the particular device.

Traditional methods of using a GUI (on a computer for example) include the use of an input device such as a mouse or a track ball. A movement of the mouse or the track ball results in a corresponding graphical cursor (sometimes called a cursor or a pointer) moving on the graphical user interface. The graphical cursor (or pointer) can thus be navigated to an object (represented by an icon) on the GUI that corresponds to an executable task such as launching a software application for example.

Once the graphical cursor is navigated to an icon, the corresponding task can be executed by clicking (depressing) on an actuating button that is integrated within the input device. For example, if the icon on the GUI corresponds to a word processing application, clicking on the icon results in launching the word processing application. The graphical cursor can also be used to rapidly scroll through pages of text within a word processing document for example.

More recently, other input devices such as the Free Space Pointing Device™ developed by Hillcrest™ Labs of Rockville, Md. (assignee of the present application) have incorporated functionality associated with a mouse or track ball. The Free Space Pointing Device is a handheld device similar to that illustrated in FIG. 10. This device, like a mouse or a track ball, has a corresponding graphical cursor which can be navigated around on a display or user interface to highlight, select and actuate buttons (or icons) for executing functions associated with the buttons.

By holding the Free Space Pointing Device and through hand and arm gestures or movement (twisting or waving of the hand for example) of the user, the graphical cursor can be navigated to the desired buttons for selection and actuation.

The precision of the Free Space Pointing Device enables detection of the slightest movements of a user. The graphical cursor may be navigated to an icon (or a button) by user hand movement and the user may contemplate his or her next action prior to actuating the icon. During this time, slight movements of the user hand, given the precision of the device, may lead to drifting of the graphical cursor from the highlighted or selected (but not yet actuated) icon. This may take place, for example, during a presentation or a tutorial in which the user may be explaining to an audience the functionality associated with a highlighted (or selected) icon prior to actuating the icon. In order to actuate the icon, additional user action (such as movement) may be required to reposition the graphical cursor on the icon of interest before actuation of the icon.

Some embodiments provide controlled navigation of a graphical cursor on a user interface.

SUMMARY

Methods according to the present invention address these needs and others by providing a method for maintaining the position of a graphical cursor within the bounds of an icon or a visual graphic object.

According to one exemplary embodiment of the present invention, a method for actuating a button on a graphical user interface (GUI) includes navigating a graphical cursor corresponding to an input device onto the button, activating a fence around a border of the button if the navigation occurs via a pre-defined portion of the border and navigating the graphical cursor away from the button via a pre-defined area of the button.

In another embodiment a method for controlling a widget bar on a display includes navigating a graphical cursor corresponding to an input device to a pre-defined location of the display to make visible a widget bar, activating a fence around the border of the widget bar and actuating at least one of a plurality of buttons on the widget bar wherein the pre-defined location corresponds to an opening along a border of the widget bar.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

For purposes of this invention, terms such as "button" and "icon" may be used interchangeably. Similarly, terms "actuation" may also to refer to "clicking" of a button or an icon. The terms "fence" and "corral" may also be used interchangeably. Each of the terms "graphical cursor", "cursor" and "pointer" may refer to the same element.

In exemplary embodiments, borders of buttons may be utilized to provide controlled navigation of a graphical cursor on a user interface. A button may correspond to or represent a number on a keypad for example. The keypad may be displayed on a user interface and the individual keys can be actuated. A button may also represent a function such as a 'play' button on a DVD menu (for operating functions of a DVD player). The DVD menu may also be displayed on a user interface. A button may represent other functions in addition to those listed herein.

Figure 1:
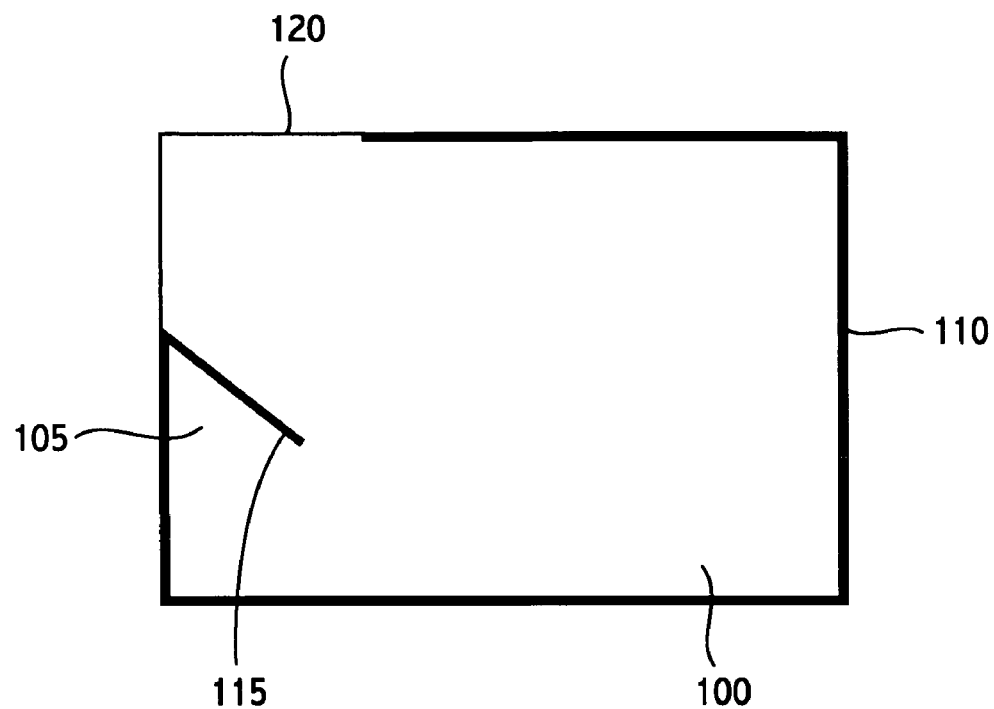
FIG. 1 illustrates a button or icon with a fence according to exemplary embodiments.
Figure 2:
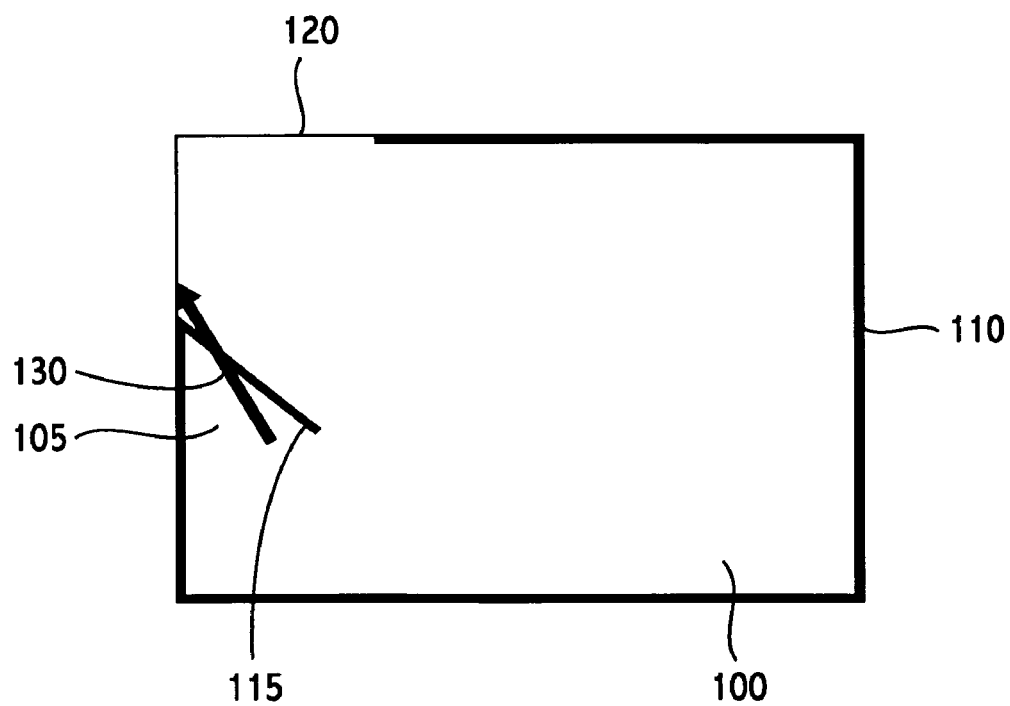
FIGS. 2 and 3 illustrate exemplary user gestures for actuating buttons on a user interface.

FIG. 1 illustrates an embodiment in which a button 100 may have a border. Button 100 may include an opening 120. In order to select a button for actuation, the user may navigate a graphical cursor (controlled by movement of a 3D pointing device for example) onto button 100 via opening 120. As the graphical cursor is navigated onto button 100 via opening 120, a fence (or corral) 110 of button 100 may be activated. Opening 120 may appear as a break in the fence. A gate 115 (resembling an open gate) may be formed at a junction of the corral 110 and the opening 120 and appears as extending inward from the border at an angle. Opening 120 is shown as being on the upper left side of button 100 for purely illustrative reasons; it may be located along any portion of the button border.

Upon corral activation, the graphical cursor may remain within the corral (fence) 110 surrounding button 100 even if a user makes large movements such as moving her hand for example. The button may then be actuated in a manner described in further detail below.

The graphical cursor may also be navigated onto button 100 via portions of the border outside of opening 120 (such as from the top, the right or the bottom of button 100 in FIG. 1 for example). Such navigation onto button 100 (i.e. via portions outside of opening 120), however, will not result in corral activation. As a result, button actuation will not be facilitated. Further user movement (after navigating graphical cursor onto button 100) may result in corresponding graphical cursor movement, even beyond button 100 based on the extent of user movement. Button 100 may not be actuated if the graphical cursor is navigated onto button 100 in this manner (i.e. outside of opening 120).

As described above, the graphical cursor may be navigated onto button 100 via opening 120 to enable button actuation. In order to provide additional control over navigation of the graphical cursor, button 100 may be actuated by navigating the graphical cursor away from button 100 over a pre-defined area of the button such as area 105 of FIG. 1. Such navigation may correspond to a user gesture.

The pre-defined area in one embodiment corresponds to the funnel-like (or the inverted-V-shaped) area 105 of button 100 defined by fence 110 and gate 115 along the middle of the left side of button 100 in FIGS. 1-4. The corresponding user gesture, roughly approximating a clockwise movement, may be illustrated by arrow 130 in FIGS. 2 and 3. Since the corral is activated, the user cannot navigate the graphical cursor away from the button over the corral 110 on the left side. Therefore, if button actuation is desired, the user may navigate the graphical cursor in an approximate clockwise motion through area 105 of button 100. Once the graphical cursor enters area 105, further navigation results in the graphical cursor moving through the tip of the inverted-V-shaped area 105 and off the button 100.

By navigating a graphical cursor onto button 100 via the opening 120 and then away from the button via area 105 of button 100 (and opening 120) in an approximate clockwise movement, the button may be actuated. The actuation may correspond to a function associated with the button being performed similar to clicking on an icon for example.

Figure 3:
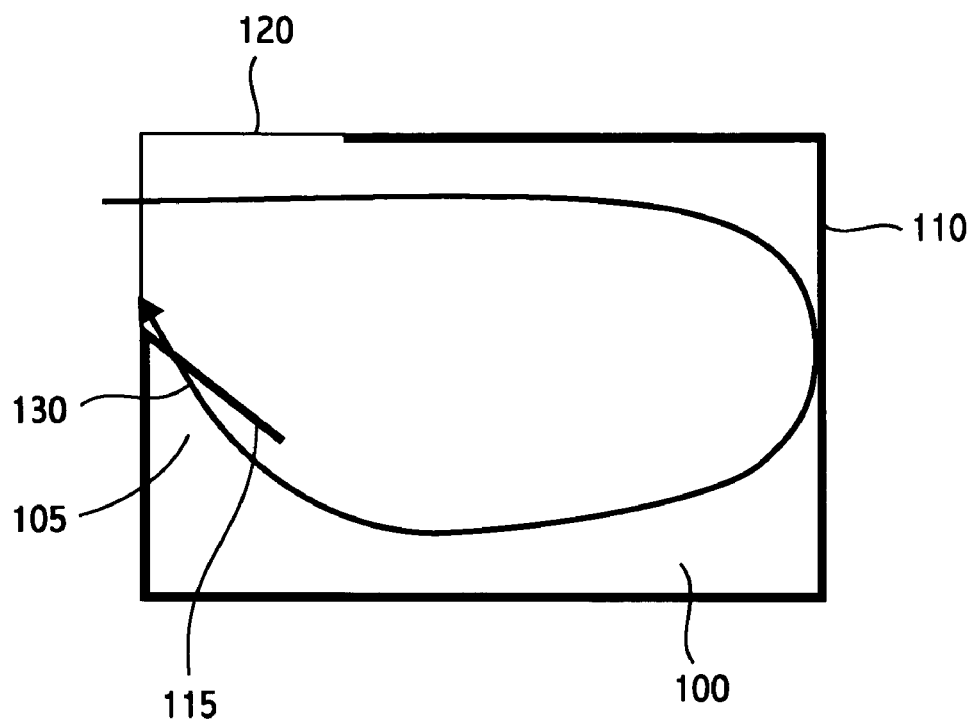

Other variations of navigating a pointer to actuate a button may include navigating the button along the left side border and off the button via area 105 (and opening 120) as illustrated by arrow 130 in FIG. 3.

Figure 4:
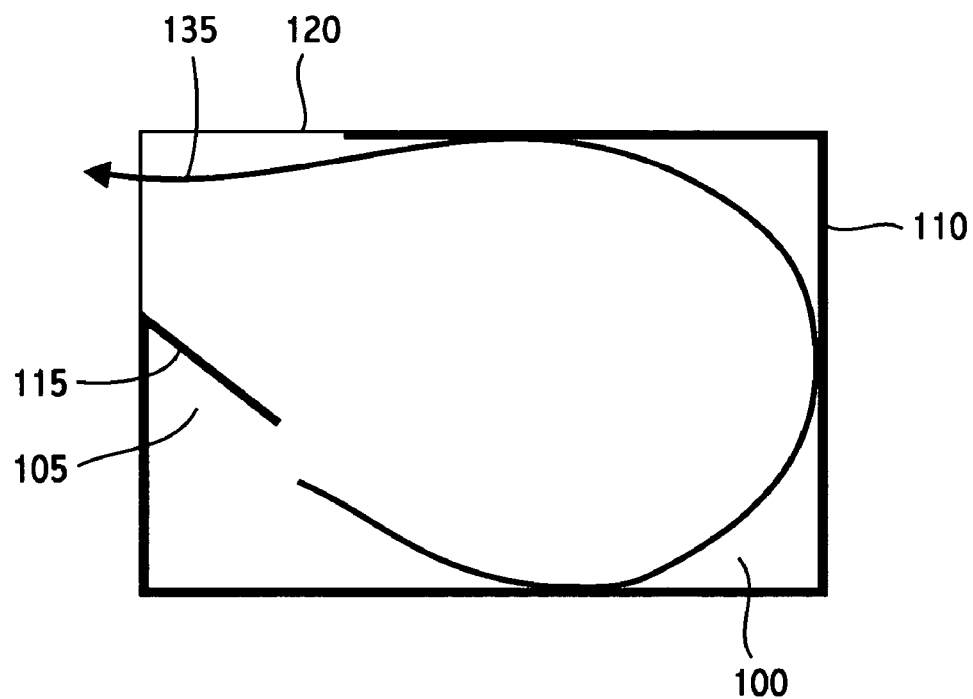
FIG. 4 illustrates an exemplary user gesture for navigating a graphical cursor from a button on a user interface without actuation.

Fence 110 may be deactivated by navigating the graphical cursor out of button 100 via opening 120 utilizing the path illustrated by arrow 135 in FIG. 4. This navigation path may approximate a counter clockwise movement (or user gesture) as illustrated by arrow 135. The pointer may be navigated along the top of the border and off the button via opening 120. This gesture (i.e. counter clockwise) may indicate that a user initially intended to actuate button 100 by entering via opening 120 and then changed his mind about the actuation. As a result, functionality associated with button 100 may not be executed. The arrow 135 does not pass through area 105 defined by fence 100 and gate 115 in this embodiment.

Figure 5:
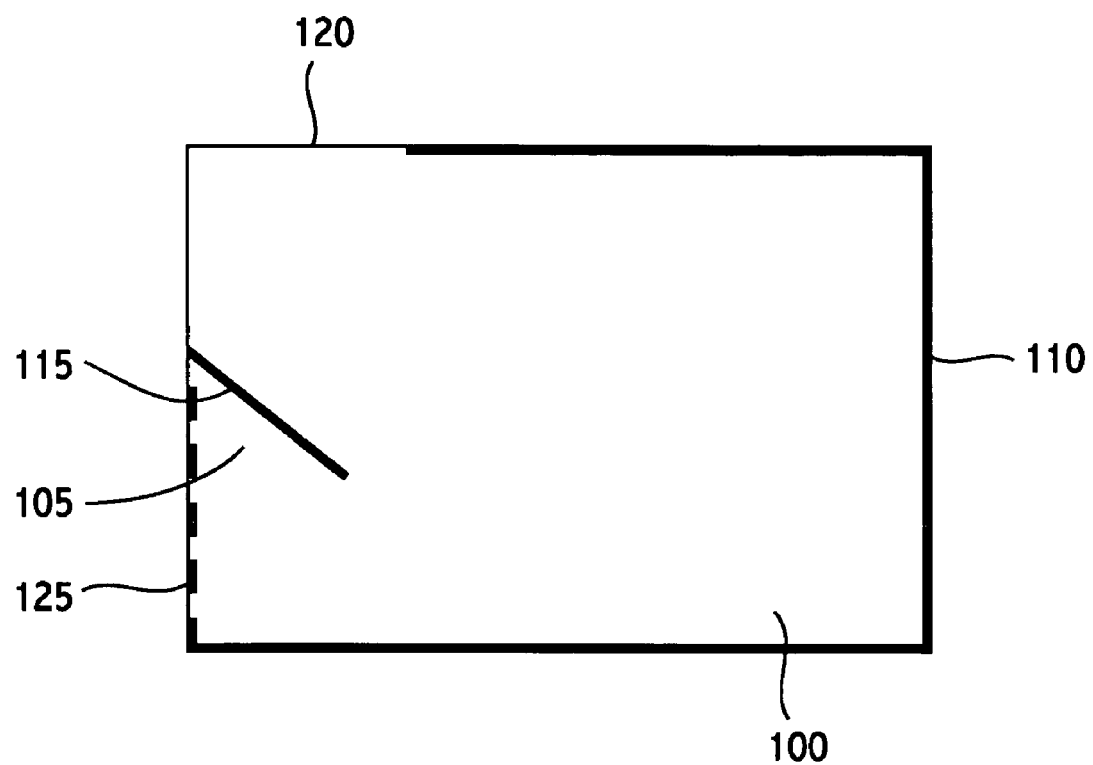
FIG. 5 illustrates an exemplary button with an expanded opening for navigating a graphical cursor onto a button.

In other embodiments, an opening for entering the button for actuation may be defined by an entire side of the button. The opening for leaving the button may be limited to a portion of the side. As illustrated in FIG. 5, the entire left side of the button including portions 120 and 125 may define the opening for navigating the graphical cursor onto the button. The graphical cursor may be navigated off the button via opening 120 (and not portion 125) which represents only a portion of the left side of the button.

All buttons or icons on a user interface may be designed in this manner to facilitate a consistent user experience on a user interface. The user may develop a navigation habit for actuating the icons by utilizing the clockwise gesture as described. Similarly, a navigation habit for moving the graphical cursor away from the button utilizing the counter clockwise gesture may also be developed by the user.

Figure 6:
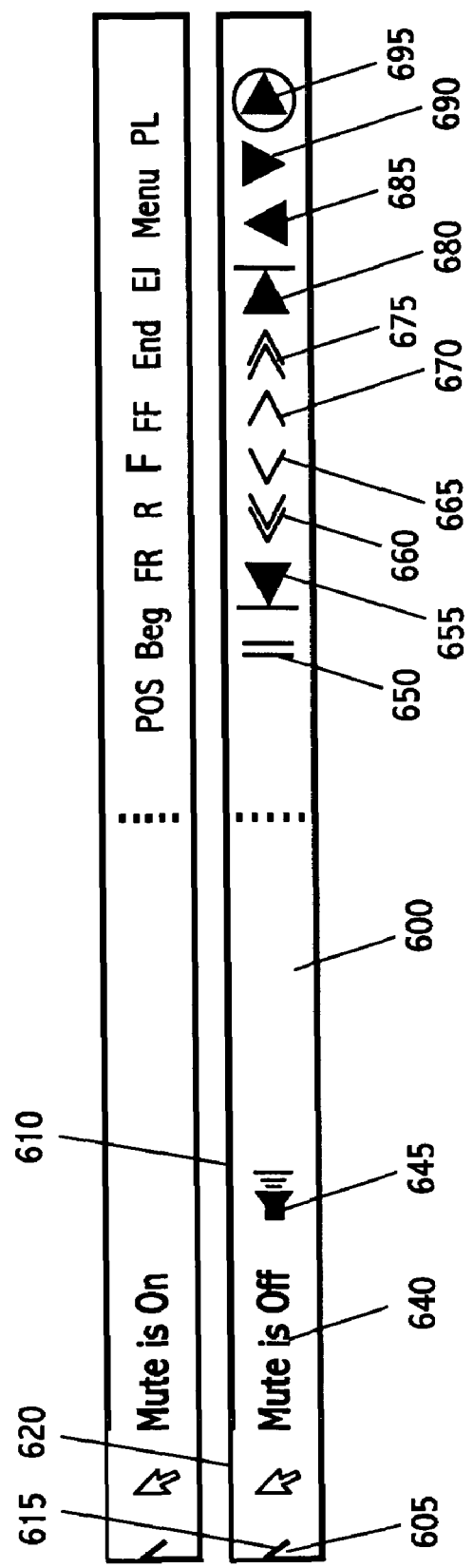
FIG. 6 illustrates an exemplary widget bar.

The fence or corral described above may be applicable within a user interface in combination with other button actuation methods in some embodiments. For example, as illustrated in FIG. 6, a quick access widget bar 600 for controlling functionality of a DVD player may be displayed upon demand on a display screen (such as a TV or a monitor) while a DVD disc is being played in the DVD player. Widget bar 600 may be distracting to the user (or viewer) if always displayed on the screen; the user, however, may wish to have the widget bar displayed on demand.

An opening, such as opening 620, may facilitate navigating a graphical cursor onto widget bar 600 in order to display the widget bar and to provide a user access to functions on the widget bar. The opening may be pre-defined as being located in the lower left hand corner of the display screen for example.

Widget bar 600 may include, in this purely illustrative and exemplary embodiment, functions associated with controlling a DVD player as illustrated in FIG. 6. The functions may include mute 640, volume (illustrated by a speaker) 645, pause 650, begin 655, fast reverse 660, reverse 665, forward 670, fast forward 675, end 680, eject 685, menu 690 and play 695.

During normal viewing, widget bar 600 may be invisible on the screen. The widget bar 600 may become visible (or displayed on the screen) by a user navigating a graphical cursor to the lower left hand corner of the display. The lower left corner in an exemplary embodiment may represent the opening 620 for the widget bar. Once the widget bar 600 becomes visible on the screen, corral 610 may be activated around widget bar 600 along with gate 615 on the lower left side of the widget bar.

As described, once corral activation takes place, user gestures or movement have no effect on the position of the graphical cursor unless the graphical cursor is navigated out of the button 600 via area 605 defined by the junction of corral 610 and gate 615. Absent such movement through area 605, the graphical cursor may remain within the widget bar 600. If the user wishes to leave the widget bar, a counter clockwise gesture as described may result in the graphical cursor leaving the widget bar and the widget bar may become invisible.

As the widget bar 600 becomes visible on the screen, the graphical cursor may be navigated to each of the functional buttons 640 to 695. Button 640 corresponding to "mute" may be actuated in the manner described above; that is, the graphical cursor may be navigated off button 640 in a clockwise gesture via area 605 defined by corral 610 and gate 615.

The remaining functional buttons (i.e. buttons 645 to 695) may be actuated in the traditional manner; that is, they may be actuated by navigating the graphical cursor over to the desired button and the button may be clicked on to execute the corresponding functionality.

Figure 7:
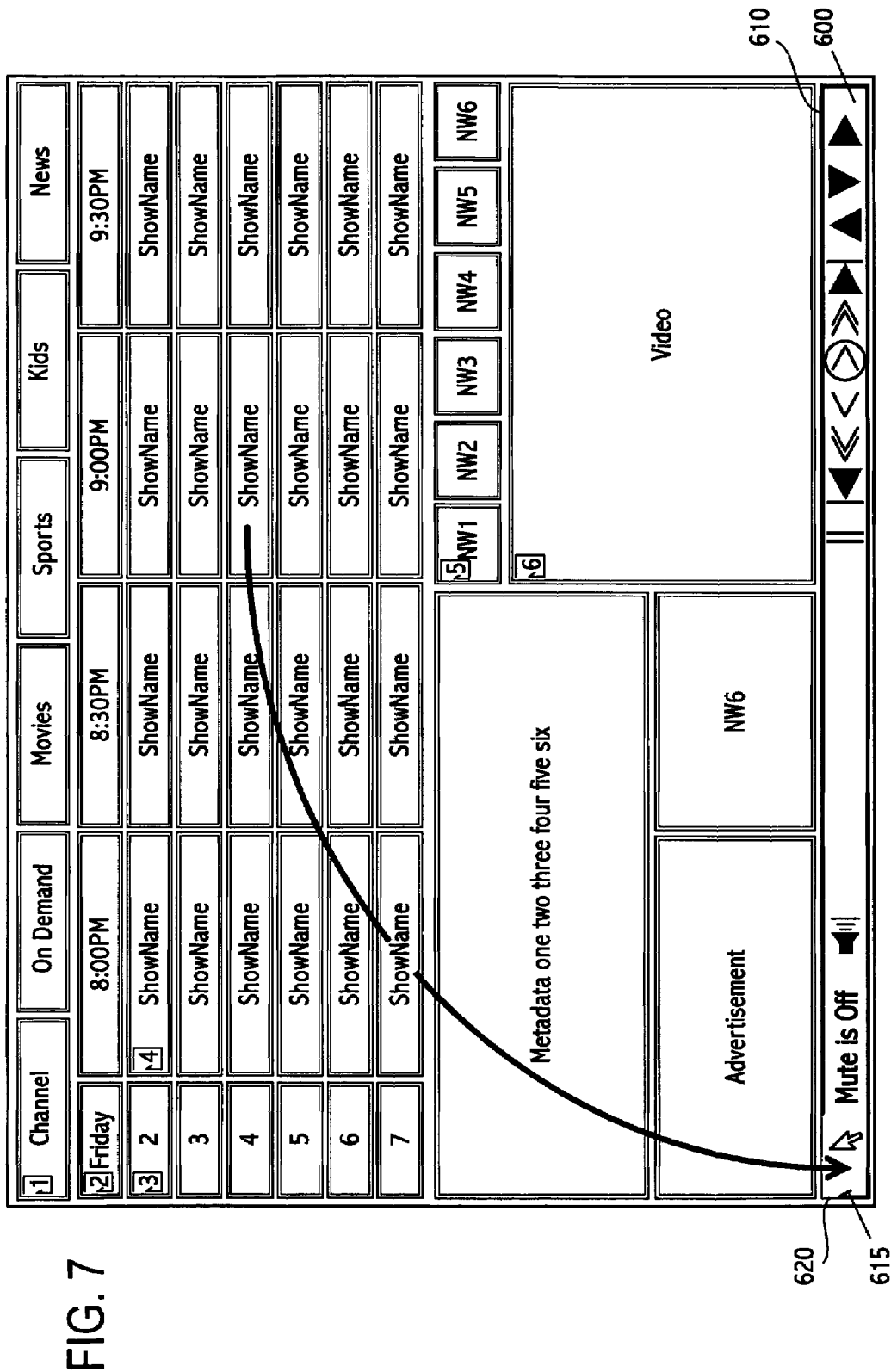
FIGS. 7 and 8 illustrate a widget bar within a programming guide according to exemplary embodiments.
Figure 8:
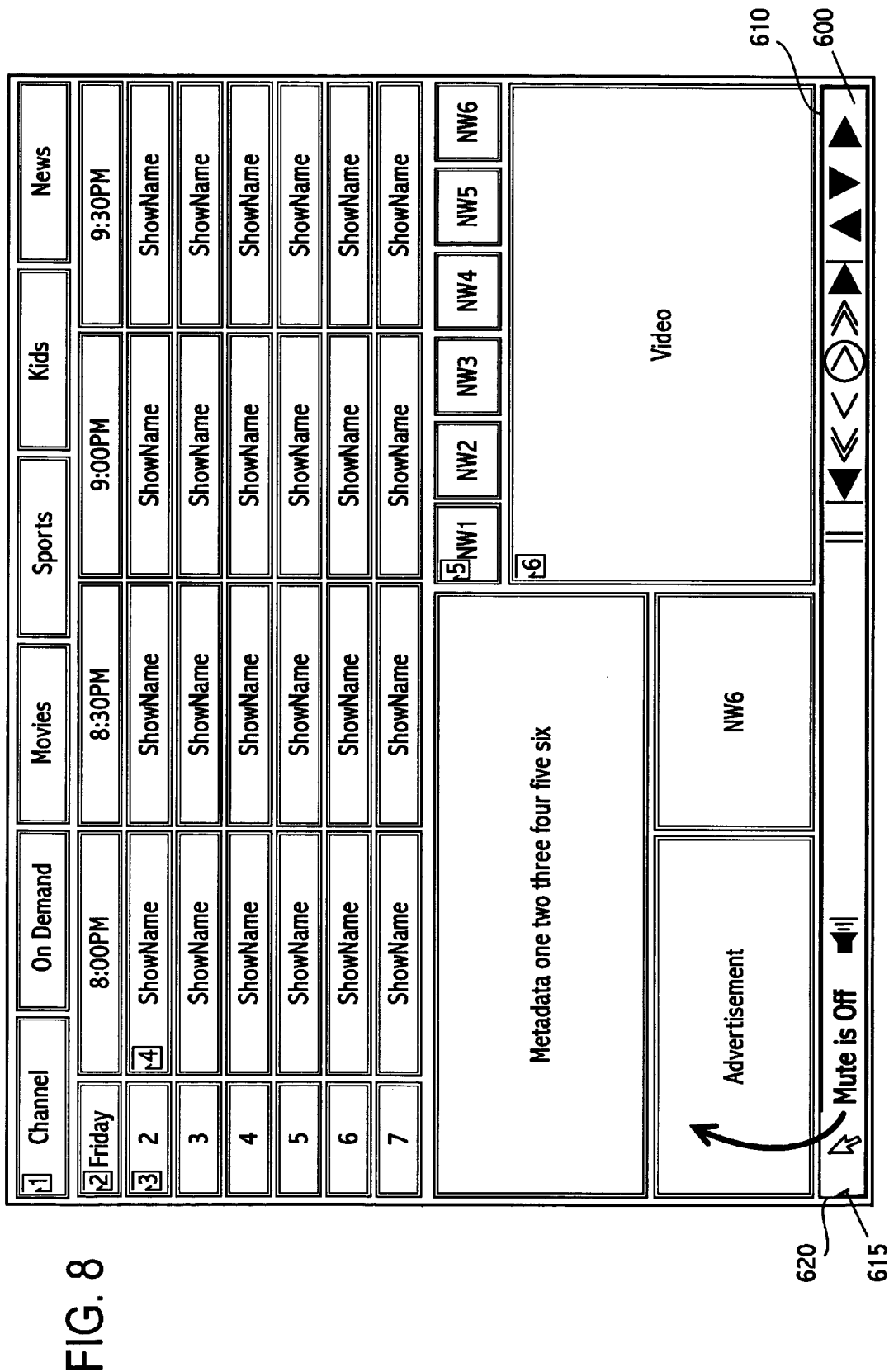

A widget bar as described may also be included within a programming guide or menu as illustrated in FIGS. 7 and 8. The menu highlights programming schedules as well as special buttons for broadcast (CBS, FOX, ABC, NBC, etc.) and cable/subscription channels (HBO, STARZ, etc.).

The arrow path in FIG. 7 may represent graphical cursor navigation for making widget bar 600 visible and activating corral 610. The arrow path if FIG. 8 may represent graphical cursor navigation for exiting widget bar 600 without actuating the mute function since in this exemplary embodiment, the graphical cursor was not navigated via area 605 defined by corral 610 and gate 615.

The widget bar 600 may be further enhanced to include voice feedback to the user as the graphical cursor is navigated over each of the buttons 640 to 695. The functionality of each of these buttons may be announced to the user.

Figure 9:
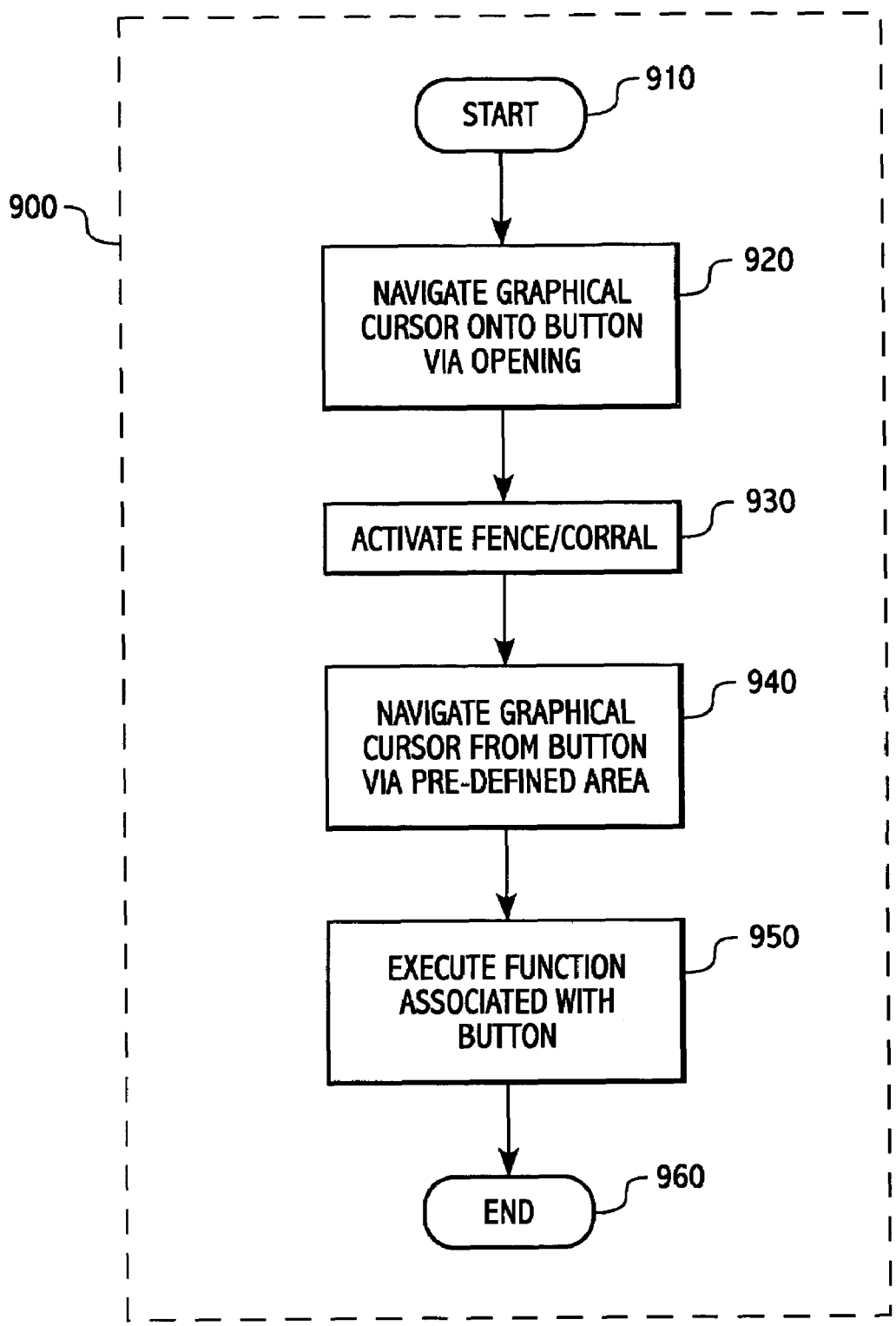
FIG. 9 illustrated an exemplary method for button actuation.
Figure 10C:
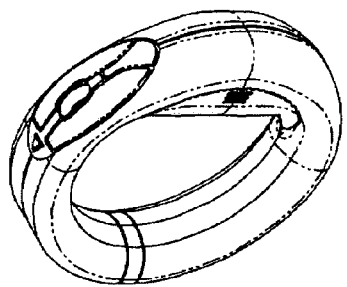
FIGS. 10A-10G illustrate various perspective views of a 3D pointing device.
Figure 10F:
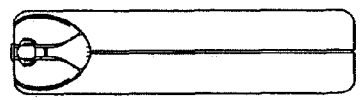
Figure 10B:
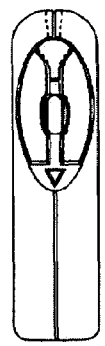
Figure 10E:
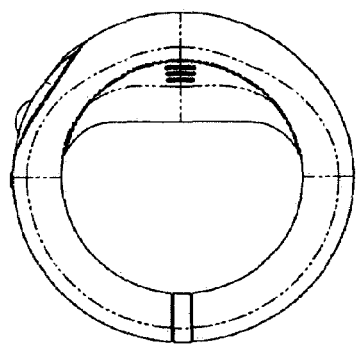
Figure 10G:
Figure 10A:
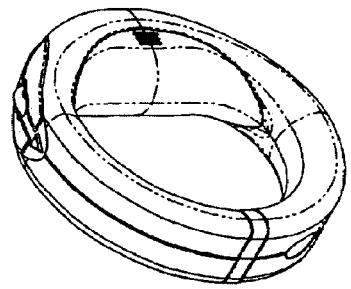
Figure 10D:

Methods in accordance with exemplary embodiments as described above may be illustrated as process or flow chart 900 in FIG. 9. A graphical cursor corresponding to an input device may be navigated onto a button 100 via a pre-defined portion 120 along a border of button 100 at step 920. A fence (or corral) 110 may be activated at step 930. The graphical cursor may be navigated from button 100 via a pre-defined area of the button to actuate the button at step 940. A function associated with button 100 may be executed at step 950.

The gestures incidental to actuation (approximately clockwise) and exit (approximately counter clockwise) are purely illustrative and other gestures or movements may become incident based on the location of the gate along the button border. For example, if the gate is located along the right side of a button, a graphical cursor navigation path approximating a counter clockwise movement may lead to button actuation and a graphical cursor navigation path approximating a clockwise movement may lead to the graphical cursor moving off a button without actuation and deactivating the corral. The location of the opening for a button is also arbitrary; it need not be in the upper left hand corner as illustrated in exemplary embodiments.

Method described may be implemented using known Java language programming techniques.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method of actuating a button on a graphical user interface (GUI), said method comprising the steps of:
   navigating a graphical cursor corresponding to an input device onto the button;
   activating a fence around a border of said button if the navigation onto the button occurs via a pre-defined portion of the border; and
   navigating the graphical cursor away from said button via (i) a pre-defined area of the button, which is different from said pre-defined portion and which is a funnel-like area, and then though (ii) a tip of the funnel-like pre-defined area, to actuate said button, wherein the funnel-like pre-defined area corresponds to an area formed by the fence and a gate, said gate extending from a junction of the fence and the pre-defined portion.

2. The method of claim 1, wherein the border of the button comprises at least the fence and the pre-defined portion.

3. The method of claim 2, wherein the pre-defined portion is an opening and excludes the fence.

4. The method of claim 1, wherein the navigation of the graphical cursor via the pre-defined area causes an execution of a function associated with said button.

5. The method of claim 1, wherein a navigation path of said graphical cursor via said pre-defined area of the button corresponds to a user gesture approximating a clockwise movement.

6. The method of claim 1, wherein the fence activation prevents the graphical cursor from leaving the button.

7. The method of claim 1, wherein the fence is not activated if the navigation onto the button occurs outside the pre-defined portion of the border.

8. The method of claim 1, wherein a navigation of the graphical cursor from the button via a path not including the pre-defined area of the button causes a deactivation of the fence.

9. The method of claim 1, wherein the input device is a 3D pointing device.

10. The method of claim 1, wherein the button is an icon.

11. The method of claim 1, wherein the funnel-like pre-determined area is a V-shaped area.

12. A method for controlling a widget bar on a display, said method comprising the steps of:
    navigating a graphical cursor corresponding to an input device to a pre-defined location of the display to make visible a widget bar;
    activating a fence around the border of said widget bar when said graphical cursor enters said widget bar via said pre-defined location; and
    actuating at least one of a plurality of buttons on the widget bar by moving the graphical cursor over the at least one of a plurality of buttons and then away from the widget bar via (i) a pre-defined area of the at least one of a plurality of buttons, which is different from said pre-defined location and which is a funnel-like area, and then though (ii) a tip of the funnel-like pre-defined area, wherein the funnel-like pre-defined area corresponds to an area formed by the fence and a gate, said gate extending from a junction of the fence and the pre-defined location.

13. The method of claim 12, wherein at least one of the buttons is actuated by a user click.

14. The method of claim 12, wherein the buttons represent functionality associated with an entertainment system.

15. The method of claim 14, wherein the entertainment system includes at least one of a Digital Versatile Disk (DVD) player and a Digital Video Recorder (DVR).

16. The method of claim 12, wherein the funnel-like pre-determined area is a V-shaped area.

17. A method of actuating a button on a graphical user interface (GUI), said method comprising the steps of:

navigating a graphical cursor corresponding to an input device onto the button; and
  activating a fence around a border of said button if the navigation onto the button occurs via a pre-defined portion of the border
  actuating said button by executing a predetermined movement by a user by moving the graphical cursor away form the button via (i) a pre-defined area of the button, which is different from said pre-defined portion and which is a funnel-like area, and then though (ii) a tip of the funnel-like pre-defined area, wherein the funnel-like pre-defined area corresponds to an area formed by the fence and a gate, said gate extending from a junction of the fence and the pre-defined portion.

18. The method of claim 17, wherein the funnel-like pre-determined area is a V-shaped area.

\* \* \* \* \*